United States Patent Office 3,449,347
Patented June 10, 1969

3,449,347
4-(2'-TETRAHYDROFURFURYLOXY CARBONYL)-PHENYLAMINO-CHLORO-QUINOLINES
André Allais, Les Lilas, and Pierre Girault, Paris, France, assignors to Roussel-Uclaf, Paris, France, a corporation of France
No Drawing. Filed Mar. 20, 1967, Ser. No. 624,242
Claims priority, application France, Mar. 31, 1966, 55,879
Int. Cl. C07d *33/36, 33/52, 33/48*
U.S. Cl. 260—287   3 Claims

ABSTRACT OF THE DISCLOSURE

Novel 4-[(2'-tetrahydrofurfuryl-oxycarbonyl)-phenylamino]-7-or 8-chloro-quinolines and their non-toxic, pharmaceutically acceptable acid addition salts thereof, their preparation and use as analgesic and anti-inflammatory agents.

OBJECTS OF THE INVENTION

It is an object of the invention to provide the novel compounds 4 - [(2' - tetrahydrofurfuryloxycarbonyl)-phenylamino]-7- or 8-chloro-quinoline and their non-toxic, pharmaceutically acceptable acid addition salts thereof.

It is another object of the invention to provide a novel process for the preparation of 4-[(2'-tetrahydrofurfuryloxycarbonyl)-phenylamino]-7- or 8-chloroquinolines and their non-toxic, pharmaceutically acceptable acid addition salts.

It is a further object of the invention to provide novel analgesic and anti-inflammatory compositions.

It is an additional object of the invention to provide a novel method of relieving inflammation and pain in warm-blooded animals.

These and other objects and advantages of the invention will become obvious from the following detailed description.

THE INVENTION

The novel products of the invention are selected from the group consisting of 4-[(2'-tetrahydrofurfuryloxycarbonyl)-phenylamino]-chloro-quinolines of the formula

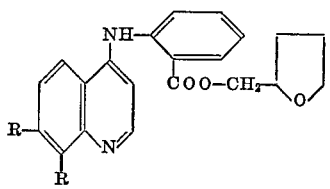

I wherein one R is hydrogen and the other R is chlorine and their non-toxic, pharmaceutically acceptable acid addition salts.

Examples of suitable acids for the acid addition salts are inorganic acids such as hydrochloric acid, sulfuric acid, nitric acid, phosphoric acid, etc., and organic acids such as acetic acid, tartaric acid, benzilic acid, citric acid, maleic acid, molanic acid, fumaric acid, etc.

The novel compounds of the invention possess interesting pharmacological properties, particularly an important analgesic activity and a pronounced anti-inflammatory activity substantially greater than known products. Mephenamic acid or phenylbutazone possess anti-inflammatory activity, but are devoid of any analgesic effectiveness. Also, meperidine or propoxyphene are active as analgesics but are devoid of any anti-inflammatory activity and these analgesics also have a depressive effect on the central nervous system or show habit-forming phenomena of which the compounds of the present invention are completely devoid. Furthermore, the compounds of the invention are far more active than known analgesic-anti-inflammatory agents such as acetylsalicylic acid, aniline derivatives or cinchoninic acid derivatives.

The novel process of the invention comprises reacting 4-(2'-carbo-lower alkoxy-phenylamino) - chloro-quinoline wherein the chlorine is in a position selected from the group consisting of 7- and 8- with tetrahydrofurfuryl alcohol in the presence of a strong alkaline agent to form the corresponding 4 - [(2'-tetrahydrofurfuryl-oxycarbonyl)-phenylamino]-chloro-quinoline which may be converted into its acid addition salt by reaction with an organic or inorganic acid.

Preferably the 4 - (2' - carbo-lower-alkoxy-phenylamino)-7- or 8-chloro-quinoline is the 4-(2'-carbomethoxy-phenylamino)-7- or 8-chloro-quinoline and the strong alkaline agent is selected from the group consisting of alkali metals such as sodium or potassium, alkali metal amides and alkali metal hydrides such as sodium hydride.

The analgesic and antiinflammatory compositions of the invention are comprised of at least one compound selected from the group consisting of 4-[(2'-tetrahydrofurfuryloxycarbonyl) - phenylamino] - chloro-quinolines of the formula

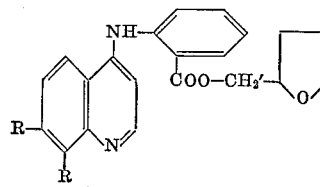

I wherein one R is hydrogen and the other R is chlorine and their non-toxic, pharmaceutically acceptable acid addition salts, and a major amount of a pharmaceutical carrier. The compositions may be prepared in the form of injectable solutions or suspensions, put up in ampoules and multiple dose flacons and in tablets, in coated tablets, in capsules and in suppositories according to known methods.

The said compositions are useful for the treatment of various pains as well as for certain inflammatory illnesses; muscular, articular or nervous algias; toothaches; rheumatic ailments, zona, migraines, febrile and infections conditions.

The novel method of the invention of relieving pain and inflammatory conditions in warm-blooded animals comprises administering to warm-blooded animals an effective amount of at least one compound selected from the group consisting of 4-[(2'-tetrahydrofurfuryl-oxycarbonyl)-phenylamino]-chloro-quinolines of the formula

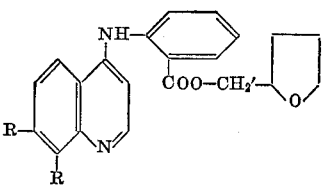

wherein one R is hydrogen and the other R is chlorine and their non-toxic, pharmaceutically acceptable acid addition salts.

The said compounds may be administered orally, transcutaneously or rectally. The usual useful dosage is between 3, 5 to 35 mg./kg. depending upon the method of administration.

In the following examples, there are described several preferred embodiments to illustrate the invention. However, it should be understood that the invention is not intended to be limited to the specific embodiments.

Example I.—Preparation of 4-[(2'-tetrahydrofurfuryl-oxycarbonyl)-phenylamino]-7-chloro-quinoline Under an atmosphere of nitrogen, 100 cc. of tetrahydrofurfuryl alcohol and 750 mg. of sodium amide were admixed and heated at 90–95° C. with stirring for 45 minutes, until the release of ammonia ceased. Then, the reaction mixture was cooled to a temperature of 60° C., and 25 gm. of 4-(2'-carbomethoxy-phenylamino)-7-chloro-quinoline were added thereto. Then the reaction mixture was again heated to 90–95° C. for 20 hours under agitation and under a continued atmosphere of nitrogen. Thereafter, the temperature was lowered to 80° C. and this temperature was maintained for 1 hour, while distilling the reaction mixture under vacuum. The residue obtained was cooled to 20° C. and poured into water. The precipitate formed was iced, filtered, washed with water and dried under vacuum to obtain 24.5 gm. of raw product, which was recrystallized from methanol, to obtain 16.5 gm. of 4-[(2'-tetrahydrofurfuryl-oxycarbonyl)-phenylamino]-7-chloro-quinoline having a melting point of 110° C.

The 4-(2'-tetrahydrofurfuryl-oxycarbonyl-phenylamino)-7-chloro-quinoline occurred in the form of crystalline needles which were very soluble in benzene and chloroform, slightly soluble in alcohol, ether and acetone and insoluble in water.

*Analysis.*—$C_{21}H_{19}O_3N_2Cl$; molecular weight=382.84. Calculated: C, 65.88%; H, 5.00%; N, 7.32%; Cl, 9.26%. Found: C, 65.7%; H, 5.1%; N, 7.3%; Cl, 9.2%.

This compound is not described in the literature.

Example II.—Preparation of 4-[(2'-tetrahydrofurfuryloxycarbonyl)-phenylamino]-8-chloro-quinoline Using the procedure of Example I, 4-(2'-carbomethoxy-phenylamino)-8-chloro-quinoline and tetrahydrofurfuryl alcohol were reacted in the presence of sodium amide to obtain 4 - [(2' - tetrahydrofurfuryloxycarbonyl)-phenylamino]-8-chloro-quinoline having a melting point of 117° C.

4-[(2'-tetrahydrofurfuryloxycarbonyl)-phenylamino]-8-chloro-quinoline occurred in the form of a crystalline product, which was very soluble in benzene and chloroform, soluble in hot ether, slightly soluble in dilute aqueous alkalis and insoluble in water.

*Analysis.*—$C_{21}H_{19}O_3N_2Cl$: molecular weight=382.84. Calculated: C, 65.88%; H, 5.00%; N, 7.32%; Cl, 9.26%. Found: C, 65.9%; H, 5.2%; N, 7.3%; Cl, 8.2%.

This compound is not described in the literature.

PHARMACOLOGICAL STUDY

A. Analgesic activity

The analgesic activity was determined by the test procedure of Koster et al. (Fed. Proc. vol. 18, p. 412, 1959), in which intraperitoneal injections of acetic acid caused repeatedly characteristic movements of twisting and stretching in mice for more than 6 hours, which is considered as the exteriorization of a diffuse abdominal pain and compounds preventing or suppressing this symptom are considered analgesics.

A 6% acetic acid solution in water admixed with 10% of gum arabic was used. The dose provoking the syndrome under these conditions was 0.01 cc./gm. or 60 mg./kg. of acetic acid. The analgesics were administered orally ½ hour prior to the intra-peritoneal injection of acetic acid, the mice having been without food since the day before the start of the experiment. For each dose and for the controls, which were used for each test, a group of 5 animals was used. The movements of stretching were observed, recorded and counted for each animal, then totaled for each group of 5 animals. The duration of the observation lasted 15 minutes, and was started immediately after the injection of the acetic acid solution. The studied products were administered in the form of an aqueous suspension. Under the said test conditions, the 50% active dose, ($DA_{50}$), of 4-[(2'-tetrahydrofurfuryl-oxycarbonyl)-phenylamino]-7-chloro-quinoline was 50 mg./kg. and for the corresponding 8-chloro isomer was 70 mg./kg. The $DA_{50}$ of acetylsalicylic acid in the same test was 165 mg./kg.

B. Anti-inflammatory activity

The test employed was that of Branceni et al., slightly modified (Arch. Int. Pharmacodym., 1964, vol. 152, p. 15). It consisted of administering to rats, weighing 160–170 gm. each, in one single injection, 500γ of naphthoyl-heparamine, into the fibrous bottom of a hind paw, which produces the development of an inflammatory edema. The products under study were orally administered in the form of an aqueous suspension one hour prior to the said injection. The maximum circumference of the hind paw was measured directly before and again 2 hours after the said injection. The difference in millimeters between the measurements after 2 hours and the initial measurement were used to estimate the extent of the inflammation measured on the conrol animals.

The $DA_{40}$ of 4-[(2'-tetrahydrofurfuryloxycarbonyl)-phenylamino]-7-chloro-quinoline, (dose which reduced 40% of the inflammatory reaction), was about 20 mg./kg. The 40% active dose of the corresponding 8-chloro isomer was of the order of 50 mg./kg.

Under the same conditions, the average active dose of acetylsalicylic acid was about 100 mg./kg.

We claim:
1. A compound selected from the group consisting of 4-[(2' - tetrahydrofurfuryloxycarbonyl) - phenylamino]-chloro-quinolines of the formula

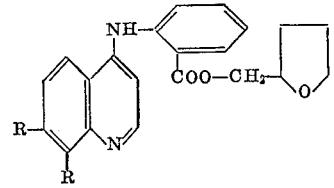

wherein one R is chlorine and the other R is hydrogen and their non-toxic, pharmaceutically acceptable acid addition salts.

2. A compound of claim 1 wherein the chlorine is in the 7- position.

3. A compound of claim 1 wherein the chlorine is in the 8- position.

References Cited

UNITED STATES PATENTS

| | | | |
|---|---|---|---|
| 2,731,467 | 1/1956 | Cusic | 260—287 |
| 3,132,145 | 5/1964 | Allais et al. | 260—286 |
| 3,151,026 | 9/1964 | Allais et al. | 260—287 X |
| 3,174,972 | 3/1965 | Allais et al. | 260—287 |
| 3,232,944 | 1/1966 | Allais et al. | 260—286 |

ALEX MAZEL, *Primary Examiner.*

D. G. DAUS, *Assistant Examiner.*

U.S. Cl. X.R.

260—286, 294, 309.5, 347.8, 471; 424—230, 258